(12) United States Patent
Jousselin (10) Patent No.: US 9,593,592 B2
(45) Date of Patent: Mar. 14, 2017

(54) BLADE TIP TIMING

(71) Applicant: ROLLS-ROYCE PLC, London (GB)

(72) Inventor: Olivier Y J P Jousselin, Bristol (GB)

(73) Assignee: ROLLS-ROYCE plc, London (GB)

( * ) Notice: Subject to any disclaimer, the term of this patent is extended or adjusted under 35 U.S.C. 154(b) by 691 days.

(21) Appl. No.: 14/224,820

(22) Filed: Mar. 25, 2014

(65) Prior Publication Data

US 2014/0363274 A1 Dec. 11, 2014

(30) Foreign Application Priority Data

May 30, 2013 (GB) .................................. 1309623.5

(51) Int. Cl.
| | |
|---|---|
| *G01M 15/14* | (2006.01) |
| *F01D 21/00* | (2006.01) |
| *G01H 1/00* | (2006.01) |

(52) U.S. Cl.
CPC ............ *F01D 21/003* (2013.01); *G01H 1/006* (2013.01); *G01M 15/14* (2013.01); *F05D 2270/334* (2013.01); *F05D 2270/821* (2013.01)

(58) Field of Classification Search
CPC ........ G01H 1/006; G01N 29/04; G01M 15/14

(Continued)

(56) References Cited

U.S. PATENT DOCUMENTS

| | | | |
|---|---|---|---|
| 4,887,468 A | 12/1989 | McKendree et al. | |
| 5,206,816 A | 4/1993 | Hill et al. | |

(Continued)

FOREIGN PATENT DOCUMENTS

| | | |
|---|---|---|
| EP | 2 136 189 A2 | 12/2009 |
| EP | 2 369 314 A1 | 9/2011 |
| EP | 2 532 839 A2 | 12/2012 |

OTHER PUBLICATIONS

Search Report issued in European Patent Application No. 14 16 1483 dated Jun. 5, 2014.

(Continued)

*Primary Examiner* — Kevin Murphy
(74) *Attorney, Agent, or Firm* — Oliff PLC (57) ABSTRACT

A method of analyzing blade tip timing data obtained from an array ($P_k$) of stationary timing probes (3) that are spaced at integer multiples of a base angle. Replace one of the probes (3) with a virtual probe ($P_v$) to give a virtual probe set (42). Set an initial probe angle ($\theta_v$) and an initial engine order ($EO_v$) for the virtual probe ($P_v$). Calculate the condition number (CN) for the virtual probe set (42). If the condition number (CN) at least meets a threshold criterion, solve the virtual probe set (42) for blade tip displacement amplitude. Else increment the virtual probe angle ($\theta_v$) and/or the virtual engine order and iterate from calculating the condition number. Else reinstate the replaced probe (3) and replace a different probe (3) from the array of probes ($P_k$) with the virtual probe ($P_v$); then iterate from setting the initial virtual probe angle and engine order.

20 Claims, 4 Drawing Sheets

(58) Field of Classification Search
USPC .......................................................... 702/56
See application file for complete search history.

(56) References Cited

U.S. PATENT DOCUMENTS

| | | | | |
|---|---|---|---|---|
| 8,457,909 | B2* | 6/2013 | Russhard | ............... G01H 1/006 |
| | | | | 702/179 |
| 8,521,493 | B2* | 8/2013 | Jousselin | ............ G06F 17/5009 |
| | | | | 703/7 |
| 8,606,541 | B2* | 12/2013 | Platt | ....................... G01H 1/006 |
| | | | | 702/170 |
| 9,217,662 | B2* | 12/2015 | Saloio, Jr. | ............... G01H 1/006 |
| 2008/0295604 | A1 | 12/2008 | Hoyte et al. | |
| 2009/0319206 | A1* | 12/2009 | Russhard | ............... G01H 1/006 |
| | | | | 702/56 |
| 2013/0226518 | A1* | 8/2013 | Jousselin | ............... G01H 1/003 |
| | | | | 702/176 |

OTHER PUBLICATIONS

Search Report issued in British Application No. 1309623.5 dated Jan. 10, 2014.

\* cited by examiner

BLADE TIP TIMING

The present invention relates to a method of analysing blade tip timing data obtained from an array of stationary timing probes that are spaced at integer multiples of a base angle. It finds particular, though not exclusive, utility where the blade tip timing data is obtained from a gas turbine engine turbine rotor. The present invention also relates to a displacement system for performing the method.

A gas turbine engine turbine rotor, particularly for a high pressure turbine stage, comprises an array of rotor blades. The rotor stage casing of a turbine stage generally comprises shroud segments mounted radially inwardly of the casing. It is generally only possible to drill apertures in the centre of shroud segments to receive the timing probes due to stress and thermal factors. The timing probes are therefore positioned at angles that are each an integer multiple of the angular extent of the shroud segments.

Engine orders with their cycles being an integer multiple of the shroud segment angle result in high condition numbers. Engine order is defined as the number of sinusoidal oscillations observed in one revolution of the rotor. A cycle is a single sinusoidal oscillation. Thus an engine order of 10EO comprises ten cycles, each completed in a tenth of a revolution. Current blade tip timing analysis techniques are not good at extracting blade tip amplitudes for such engine orders. Furthermore, high condition numbers result in large uncertainty in the blade tip displacements calculated.

The present invention provides a method of analysing blade tip timing data that seeks to address the aforementioned problems.

Accordingly the present invention provides a method of analysing blade tip timing data obtained from an array of stationary timing probes that are spaced at integer multiples of a base angle, the method comprising steps to:
 a) replace one of the probes in the array of probes with a virtual probe to give a virtual probe set;
 b) set an initial probe angle and an initial engine order for the virtual probe;
 c) calculate a condition number for the virtual probe set;
 d) if the condition number at least meets a threshold criterion, solve the virtual probe set for blade tip displacement amplitude; else
 e) for i=1 to m, increment the probe angle of the virtual probe by i and iterate from step c);
 f) for j=1 to n, increment the engine order of the virtual probe by j and iterate from step c);
 g) for k=1 to q, reinstate the replaced probe and replace a different probe from the array of probes with the virtual probe; iterate from step b).

Advantageously the method enables analysis of blade tip timing data where the timing probes are spaced at integer multiples of a base angle, for example the angular extent of the shroud segments surrounding the rotor. It is therefore possible to solve for any engine order, including those having cycles that are an integer multiple of the base angle.

The steps e) and f) may be performed in reverse order.

The probe angle of the virtual probe may be set in the range 0° to 360°. The increment i for step e) may be 0.1°. Alternatively a larger increment i may be used to reduce the number of iterations required. Alternatively a smaller increment i may be used to improve the accuracy of the solution.

The engine order of the virtual probe may be set in the range 0EO to 30EO. Alternatively the range may extend to larger numbers of cycles in an engine order, for example 50EO. The increment j for step f) may be 0.1EO. Alternatively a larger increment j may be used to reduce the number of iterations required. Alternatively a smaller increment j may be used to improve the accuracy of the solution. The engine order of the virtual probe may be set to non-integer values. Advantageously this reduces the number of iterations without omitting engine orders that cannot be derived without the method of the present invention.

The threshold criterion may be the minimum of all the condition numbers calculated at step c). Advantageously this gives the most accurate solution but requires all the iterations to be completed. Alternatively the threshold criterion may be an absolute condition number. For example the threshold criterion may be condition number equal to ten. Advantageously this gives a reasonable solution and may permit the method to be ended before all the iterations have been completed so the solution is found more quickly.

If the condition number at least meets the threshold criterion, the method may comprise solving the virtual probe set for blade tip displacement phase at step d). Advantageously this gives further useful information about the blade tip displacements.

The method may comprise a further step to validate the method by calculating blade tip displacement from the replaced probe. Advantageously no further measurements are required to perform the validation.

Step a) may comprise replacing two or more proves from the array of probes with virtual probes to give the virtual probe set. The minimum number of probes from the array of probes in the virtual probe set may be calculated as twice the number of simultaneous modes excited plus two.

Step c) may comprise sub-steps to:
 h) form a matrix of the blade tip displacements at each probe in the virtual probe set;
 i) perform singular value decomposition on the matrix; and
 j) calculate the condition number by dividing the largest singular value by the smallest singular value.

Advantageously this is an efficient way of calculating the condition number.

The base angle may comprise the angular extent of a shroud segment to which a probe of the array of probes is mounted. Advantageously each probe may be mounted in the circumferential centre of such a shroud segment.

The method may be repeated for each feature comprised in the array. The method may be performed in parallel for at least two of the features comprised in the array. Advantageously this enables the method to be performed substantially in real time. The method may, therefore, be used for real time monitoring of the rotor from which the displacement data is derived.

The present invention also provides a computer program having instructions adapted to carry out the method described; a computer readable medium, having a computer program recorded thereon, wherein the computer program is adapted to make the computer execute the method described; and a computer program comprising the computer readable medium.

The present invention also comprises a displacement system comprising: a rotor having an array of features, the rotor rotates at a rotational speed; an array of stationary timing probes spaced at integer multiples of a base angle, the probes arranged to measure the time at which each feature passes the probe for each revolution of the rotor; and a processor configured to perform the method as described. Each feature may comprise a blade.

Preferably all the parts of the displacement system may be commonly located, for example in a gas turbine engine. Advantageously, the method may then be performed in real time. Alternatively the processor may be located remotely to the rotor and probes. Advantageously, the method may then be performed for offline analysis of the displacement data.

The present invention also provides a gas turbine engine comprising the displacement system described. The rotor may comprise one of the group comprising: a compressor rotor; a fan; and a turbine rotor.

Any combination of the optional features is encompassed within the scope of the invention except where mutually exclusive.

The present invention will be more fully described by way of example with reference to the accompanying drawings, in which.

Figure 1:
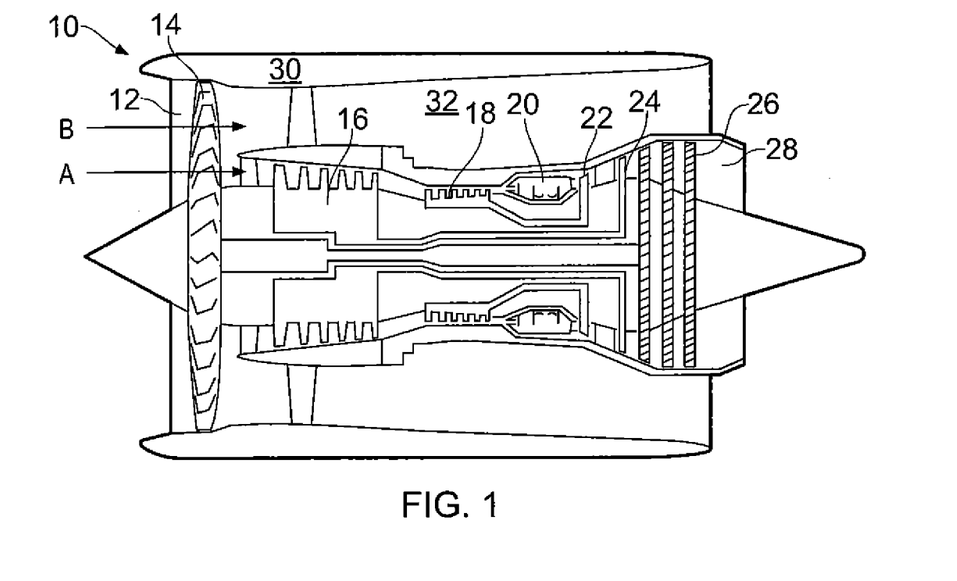
FIG. 1 is a sectional side view of a gas turbine engine.

A gas turbine engine 10 is shown in FIG. 1 and comprises an air intake 12 and a propulsive fan 14 that generates two airflows A and B. The gas turbine engine 10 comprises, in axial flow A, an intermediate pressure compressor 16, a high pressure compressor 18, a combustor 20, a high pressure turbine 22, an intermediate pressure turbine 24, a low pressure turbine 26 and an exhaust nozzle 28. A nacelle 30 surrounds the gas turbine engine 10 and defines, in axial flow B, a bypass duct 32.

Figure 2:
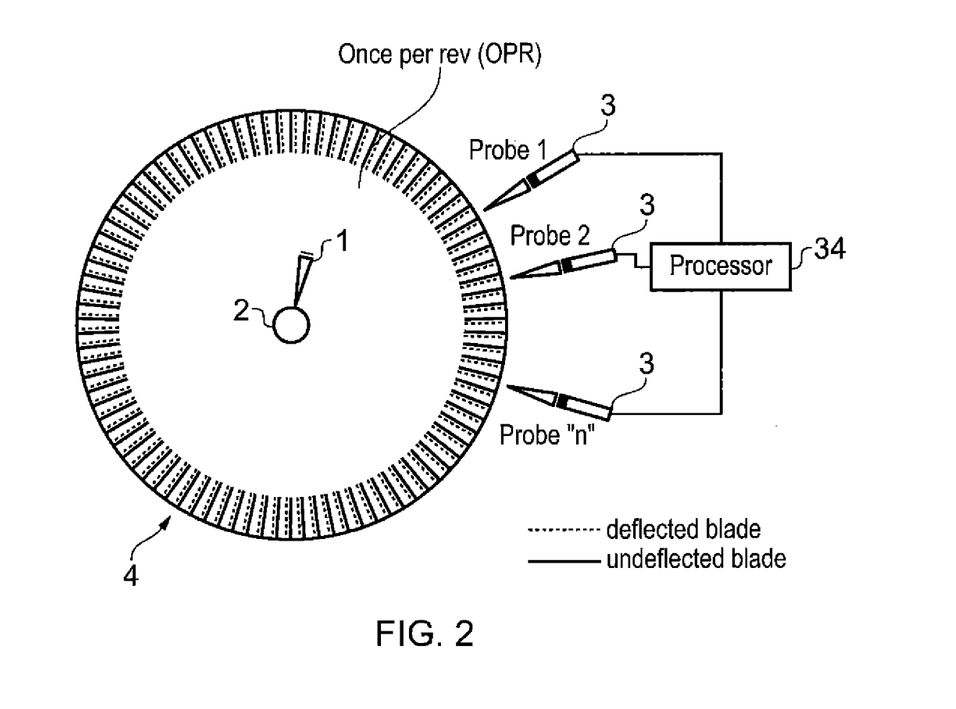
FIG. 2 is a schematic drawing of a blade tip timing arrangement.

FIG. 2 shows schematically a blade tip timing (BTT) arrangement. A once per revolution feature 1 is provided on the rotor 2. BTT probes 3 are mounted to a casing (not shown) and provide time of arrival measurements of the blades 4 mounted to the rotor 2. For example, the rotor 2 and blades 4 arrangement may be one of the stages of the low pressure, intermediate pressure or high pressure turbine 22, 24, 26. It is particularly beneficial for shrouded turbine rotor stages where the circumferential spacing between probes 3 is constrained by the angular extent of each shroud segment. The invention is also applicable to other rotor stages in a gas turbine engine 10 where the circumferential positions of the probes 3 are constrained. The probes 3 are coupled to a processor 34 and pass the time of arrival measurements thereto.

In an embodiment of the present invention there is an array of eight BTT probes $P_k$ ($P_1$, $P_2$ ... $P_8$) which are positioned at probe angles θ around at least some of the circumference of the casing. An example array of probes $P_k$ are located at 8.7°, 170.7°, 188.7°, 206.7°, 224.7°, 242.7°, 296.7° and 314.7°, each measured from top dead centre of the engine 10. The probe to probe angular spacings are integer multiples of the angular extent of each shroud segment, which in this example is 18°. The probe angles θ are displaced by the angular distance from the edge of a shroud segment to the central position in which it can be drilled to receive a probe 3.

The rotor 2 and/or the blades 4 experience vibration. The vibration may be synchronous, that is it comprises a frequency that is an integer multiple of the rotor speed, or asynchronous, that is it comprises a frequency that is a non-integer multiple of the rotor speed. Synchronous vibration may be caused by mechanical excitation, whereas asynchronous vibration is caused by non-mechanical excitation such as acoustic noise, rotating stall or blade flutter.

The probes 3 measure the time of arrival of each blade 4. The times of arrival can be converted to blade tip displacement by multiplying the times of arrival by the rotational speed ω of the rotor 2 and the radial distance between the rotor axis and the tip of the blade 4. The measured times of arrival or blade tip displacement amplitudes can be plotted against the probe angles θ and a wave fitted to the points. The wave will be in the form of an offset $A_0$ plus a constant $A_1$ multiplied by a sine component plus another constant $A_2$ multiplied by a cosine component. The amplitude of the fitted wave is thus $\sqrt{A_1^2 + A_2^2}$ and its frequency can be expressed as a targeted engine order EO multiplied by the rotational speed ω of the rotor 2.

Figure 3:
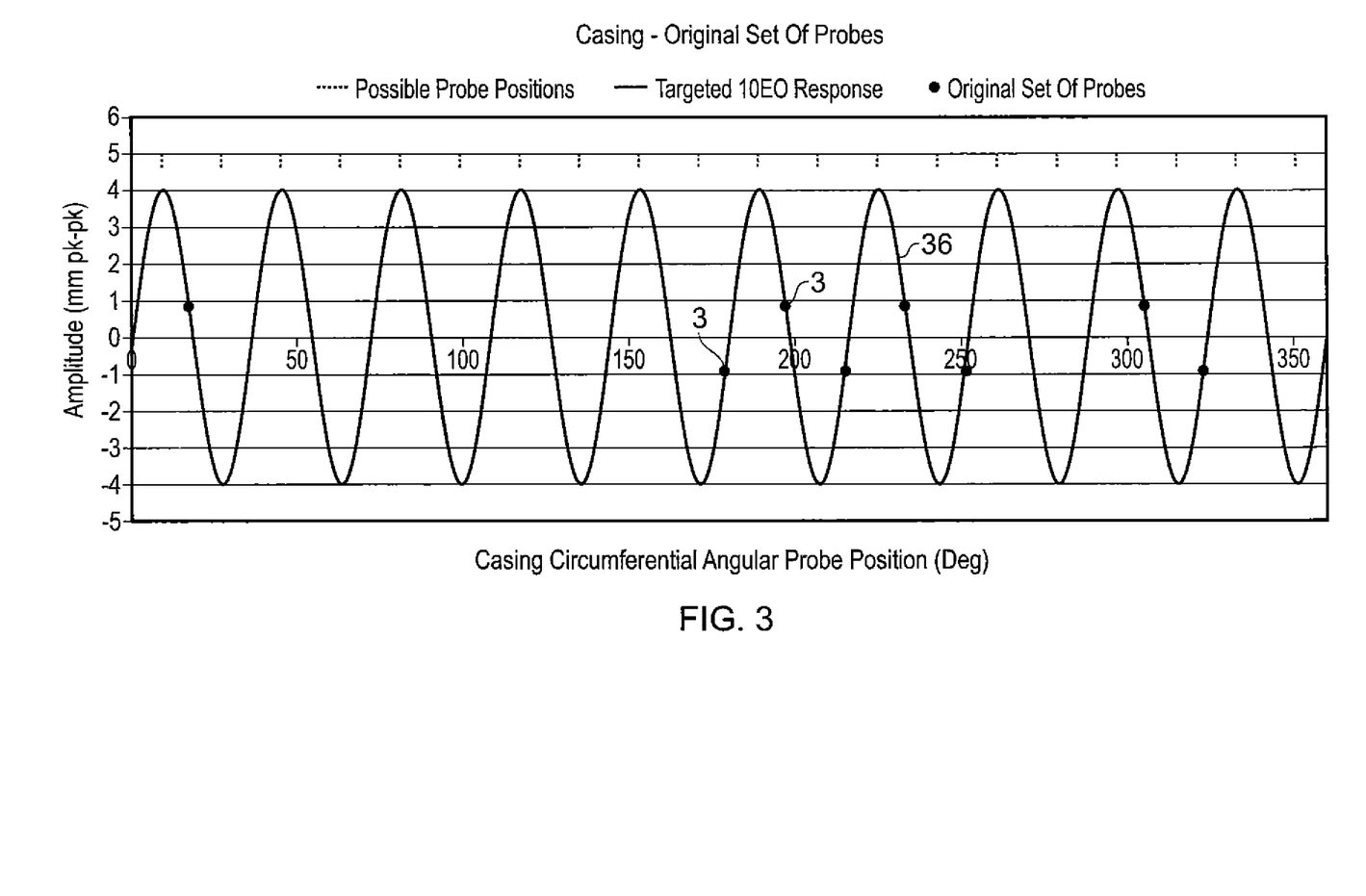
FIG. 3 is a graph of amplitude plotted against probe position for the array of probes.

FIG. 3 illustrates a fitted wave 36 for the exemplary array of probes $P_k$ at a targeted engine order of 10EO. In this case the offset $A_0$ is zero and the magnitude of the peak amplitude is constant at ~4 mm. It will be apparent that the magnitude of the amplitude calculated from each probe 3 is the same and therefore the fitted wave 36 is a simple sine wave.

The condition number CN for the array of probes $P_k$ can be calculated to give an indication of the uncertainty in the blade tip timing data obtained from the array of probes $P_k$. One way of calculating it is by forming a matrix having a column for each component of the fitted wave 36 and a row for each probe 3. The angular position of the kth probe 3 is $\theta_k$. Thus for the eight probes 3 of the exemplary array of probes $P_k$ the matrix has eight rows and three columns thus:

$$\begin{bmatrix} 1 & \sin(EO\theta_1) & \cos(EO\theta_1) \\ \ldots & \ldots & \ldots \\ 1 & \sin(EO\theta_8) & \cos(EO\theta_8) \end{bmatrix}$$

To calculate the condition number CN, singular value decomposition is applied to the matrix to extract the singular values. The condition number CN is then the ratio of the largest to the smallest singular value.

Figure 4:
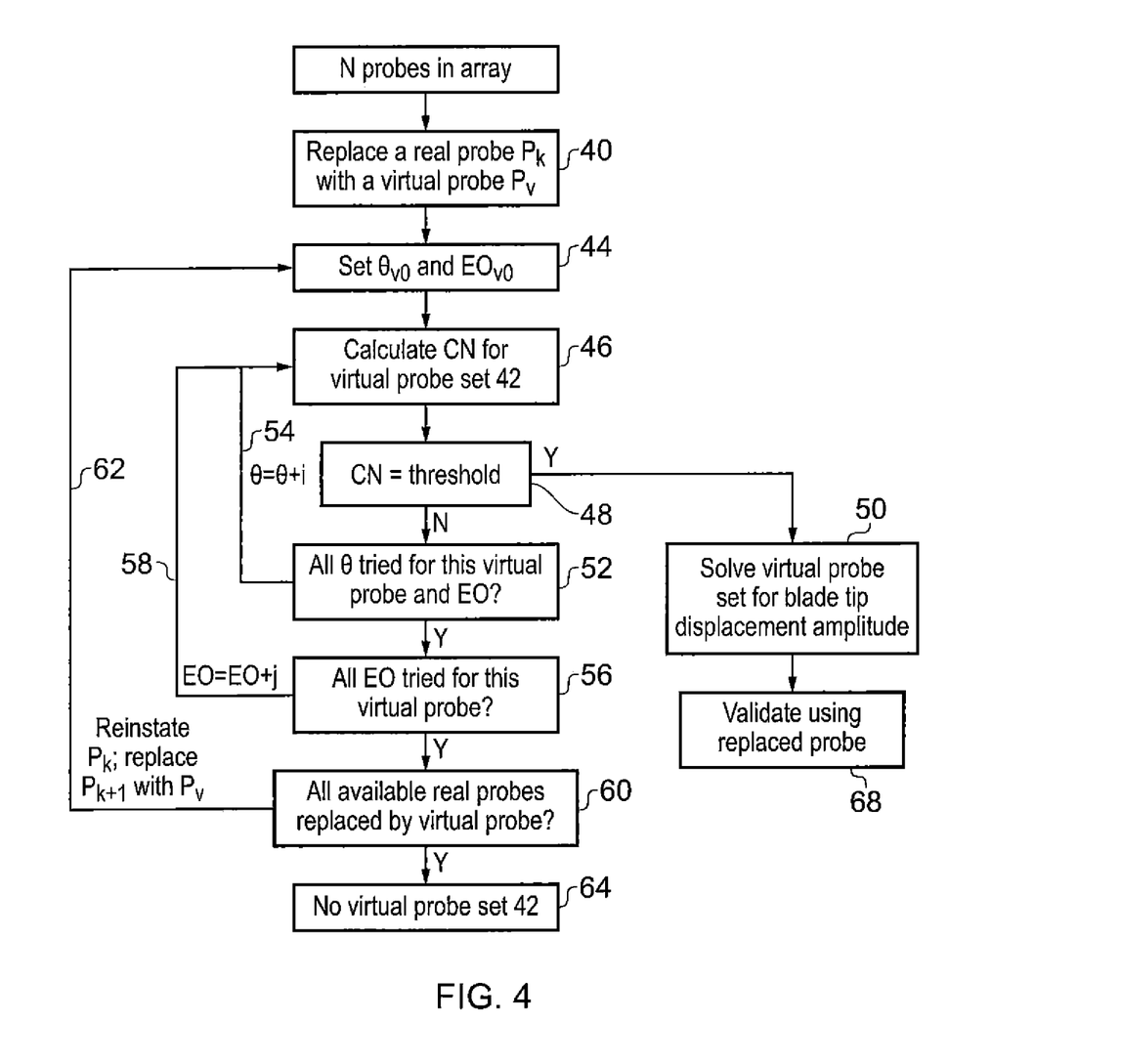
FIG. 4 is a flow chart of the method of the present invention.

The method of the present invention is shown in the flow chart of FIG. 4. In a first step 40 of the method of the present invention one of the probes 3 in the array of probes $P_k$, for example probe $P_1$, is replaced by a virtual probe $P_v$. Thus a virtual probe set 42 comprises seven probes 3 of the array of probes $P_k$, $P_2$ to $P_8$, with the virtual probe $P_v$ instead of the replaced probe $P_1$.

In a second step 44 of the method an initial probe angle $\theta_{v0}$ and an initial engine order $EO_{v0}$ are set for the virtual probe $P_v$. The initial probe angle $\theta_{v0}$ is within the range 0° and 360° and is beneficially neither the same as any of the probe angles θ of the array of probes $P_k$ nor an integer multiple of the base angle. The initial engine order $EO_{v0}$ may be set within a predetermined range of engine orders of interest, for example 0EO to 30EO, and is beneficially set to be a non-integer engine order EO since these cannot be detected with only the array of probes $P_k$. In a preferred embodiment of the method of the present invention the initial probe angle $\theta_{v0}$ of the virtual probe $P_v$ is set to 0.1° and the initial engine order $EO_{v0}$ is set to 0.1EO. However, it will be apparent to the skilled reader that many different values for the initial probe angle $\theta_{v0}$ and initial engine order $EO_{v0}$ may be chosen.

In a third step 46 of the method of the present invention the condition number CN is calculated for the virtual probe set 42. Preferably the condition number CN is calculated using singular value decomposition as described above, although other methods of calculating the condition number CN are envisaged within the scope of the claimed invention.

In a fourth step 48 of the method the condition number CN is compared to threshold criterion. If the condition number CN at least meets the threshold criterion the current virtual probe set 42 is selected and solved for blade tip displacement amplitude as shown at box 50 of FIG. 4. If the condition number CN does not meet the threshold criterion the method continues to the fifth 52 and subsequent steps as will be described.

The threshold criterion may be a maximum value for the acceptable condition number. Since the condition number for a perfect data set, that is with no noise or vibration, is CN=1 a suitable maximum value to set as the threshold criterion may be ten. Thus if the calculated condition number CN for the virtual probe set 42 is less than or equal to ten the current virtual probe set 42 is selected but if the condition number CN exceeds ten the method proceeds.

The fifth step 52 of the method comprises testing whether all possible virtual probe angles $\theta_v$ within the range have been tried for the current virtual probe $P_v$ and virtual engine order $EO_v$. If they have not, the virtual probe angle $\theta_v$ is incremented to $\theta_v+i$ on iteration loop 54. Using the incremented probe angle $\theta_{vi}$, a new condition number CN is calculated at the third step 46 and compared to the threshold at the fourth step 48. If the new condition number CN does not at least meet the threshold criterion the method tests whether all possible virtual probe angles $\theta_v$ have been tried again. If not, the virtual probe angle $\theta_v$ is again incremented on iteration loop 54.

The method continues to iterate the third 46, fourth 48 and fifth 52 steps via iteration loop 54 until all possible virtual probe angles $\theta_v$ within the range have been tried for the current virtual probe $P_v$ and virtual engine order $EO_v$. If no condition number CN at least meeting the threshold criterion has been found the method continues to the sixth step 56.

The sixth step 56 of the method comprises testing whether all possible virtual engine orders $EO_v$ within the defined range have been tried for the current virtual probe $P_v$. If they have not, the virtual engine order $EO_v$ is incremented to $EO_v+j$ on iteration loop 58. Using the incremented engine order $EO_{vj}$, a new condition number CN is calculated at the third step 46 and compared to the threshold at the fourth step 48. If the new condition number CN does not at least meet the threshold criterion the method tests whether all possible virtual probe angles $\theta_v$ have been tried at the fifth step 52. If not, the virtual probe angle $\theta_v$ is again incremented on iteration loop 54 for the current virtual probe $P_v$ and the first incremented value of engine order $EO_{vj}$.

The third 46, fourth 48 and fifth steps 52 are iterated via iteration loop 54 until the threshold criterion is at least met or all the possible virtual probe angles $\theta_{vi}$ have been tried. Then the engine order test at the sixth step 56 is revisited and the engine order $EO_{vj}$ incremented by a further step on iteration loop 58. This nested iteration continues until all virtual probe angles $\theta_{vi}$ have been tried for all virtual engine orders $EO_{vj}$ or until a calculated condition number CN at least meets the threshold criterion at the fourth step 48.

Once all virtual engine orders $EO_{vj}$ have been tried, the seventh step 60 of the method comprises testing whether each of the probes 3 in the array of probes $P_k$ has been replaced by the virtual probe $P_v$. If not, another probe $P_{k+1}$ is replaced by the virtual probe $P_v$ via iteration loop 62 and the initial probe angle $\theta_{v0}$ and initial engine order $EO_{v0}$ for the virtual probe $P_v$ is set at the second step 44 of the method. Thus the first probe $P_1$ is reinstated and the second probe $P_2$ replaced by the virtual probe $P_v$ on iteration loop 62. The method then continues through the nested iteration loops 54, 58, 62 until either a calculated condition number CN at least meets the threshold criterion or all combinations of virtual probe angles $\theta_{vi}$ and virtual engine orders $EO_{vj}$ have been tried for the virtual probe $P_v$ in place of each of the probes 3 of the array of probes $P_k$. In this case, the method ends at box 64 in FIG. 4 where no virtual probe set 42 has been found that at least meets the threshold criterion of the fourth step 48.

The threshold criterion used in the fourth step 48 of the method has been described as a maximum acceptable condition number CN. Thus the method ends when a 'good enough' virtual probe set 42, virtual probe angle $\theta_{vi}$ and virtual engine order $EO_{vj}$ has been found. Alternatively, the threshold criterion may be the minimum condition number $CN_{min}$ of all those calculated during the nested iterations of the method. In this case, as will be apparent, it is necessary to iterate for all possible virtual probe angles $\theta_{vi}$, virtual engine orders $EO_{vj}$ and replaced probes $P_k$ in order to identify the minimum condition number $CN_{min}$. Then the virtual probe set 42, virtual probe angle $\theta_{vi}$ and virtual engine order $EO_{vj}$ that result in the minimum condition number $CN_{min}$ can be used to solve for blade tip displacement amplitude at box 50.

Figure 5:
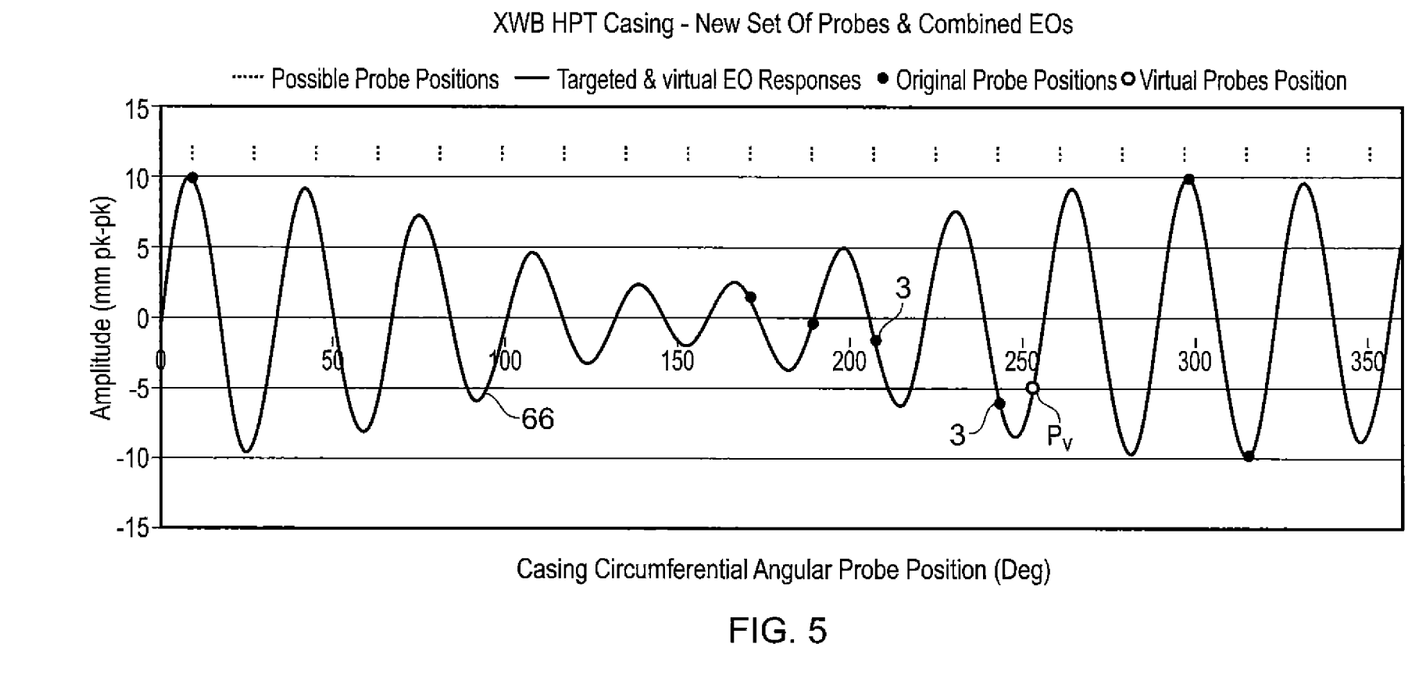
FIG. 5 is a graph of amplitude plotted against probe position for the virtual probe set.

Optionally the selected virtual probe set 42, virtual probe angle $\theta_{vi}$ and virtual engine order $EO_{vj}$ can be used to solve for blade tip displacement phase as well as amplitude at box 50. The blade tip displacement amplitudes at each probe $P_k$ of the selected virtual probe set 42 can be plotted against probe angle $\theta$ and then a wave 66 fitted as shown in FIG. 5. Since the virtual probe set 42 includes the virtual probe $P_v$ which is not located at a multiple of the base angle (the angular extent of the shroud segment), the fitted wave 66 is not a simple sine wave shape with a single peak amplitude but is a sum of two sine components. Different amplitudes are derived from the time of arrival measurements at each of the probes $P_k$ in the virtual probe set 42.

Mathematically, the blade tip displacement derived from the time of arrival measurement at each probe $P_k$ is $d_k$. The blade tip displacement derived from the time of arrival measurement at the virtual probe $P_v$ is $d_v$. The blade tip displacement at each probe $P_k$ as a result of the virtual probe $P_v$ is $d_{vk}$. The amplitudes and phases for two simultaneous vibration modes, one a targeted mode and one a virtual mode, can be extracted using the following equation, $d_k+d_v=A_0+A_1\sin(EO_1\theta_k)+A_2\cos(EO_1\theta_k)+A_3\sin(EO_v\theta_k)+A_4\cos(EO_v\theta_k)$. $A_0$ is the offset; $A_1$ and $A_2$ are constants relating to the first targeted engine order $EO_1$; and $A_3$ and $A_4$ are constants relating to the second targeted engine order $EO_2$. This equation can be written in matrix form and rearranged to add a further unknown $A_5$ that is the negative of the displacement that would have been measured at the virtual probe $P_v$ position, which in this example replaces probe $P_5$ to form the virtual probe set 42:

$$\begin{bmatrix} d_1 \\ d_2 \\ d_3 \\ d_4 \\ d_6 \\ 0 \\ d_7 \\ d_8 \end{bmatrix} + \begin{bmatrix} d_{v1} \\ d_{v2} \\ d_{v3} \\ d_{v4} \\ d_{v6} \\ d_v \\ d_{v7} \\ d_{v8} \end{bmatrix} = \begin{bmatrix} 1 & \sin(EO_1\theta_1) & \cos(EO_1\theta_1) & \sin(EO_v\theta_1) & \cos(EO_v\theta_1) & 0 \\ 1 & \sin(EO_1\theta_2) & \cos(EO_1\theta_2) & \sin(EO_v\theta_2) & \cos(EO_v\theta_2) & 0 \\ 1 & \sin(EO_1\theta_3) & \cos(EO_1\theta_3) & \sin(EO_v\theta_3) & \cos(EO_v\theta_3) & 0 \\ 1 & \sin(EO_1\theta_4) & \cos(EO_1\theta_4) & \sin(EO_v\theta_4) & \cos(EO_v\theta_4) & 0 \\ 1 & \sin(EO_1\theta_6) & \cos(EO_1\theta_6) & \sin(EO_v\theta_6) & \cos(EO_v\theta_6) & 0 \\ 1 & \sin(EO_1\theta_v) & \cos(EO_1\theta_v) & \sin(EO_v\theta_v) & \cos(EO_v\theta_v) & 0 \\ 1 & \sin(EO_1\theta_7) & \cos(EO_1\theta_7) & \sin(EO_v\theta_7) & \cos(EO_v\theta_7) & 0 \\ 1 & \sin(EO_1\theta_8) & \cos(EO_1\theta_8) & \sin(EO_v\theta_8) & \cos(EO_v\theta_8) & 1 \end{bmatrix} * \begin{bmatrix} A_0 \\ A_1 \\ A_2 \\ A_3 \\ A_4 \\ A_5 \end{bmatrix}$$

The virtual probe $P_v$ is found to be at a greater angular extent than probe $P_6$ as seen in FIG. 5, which is why the rows are in the order shown. However, it will be apparent that the row for the virtual probe $P_v$ may be inserted in place of the probe $P_5$ which it replaces.

This matrix is solvable using singular value decomposition, for example using Gaussian Jordan elimination, to obtain the values of $A_0$ to $A_5$. The amplitude of the first targeted engine order $EO_1$ is the square root of the sum of the squares of $A_1$ and $A_2$; that is $\sqrt{A_1^2+A_2^2}$. The amplitude of the virtual engine order $EO_v$ is the square root of the sum of the squares of $A_3$ and $A_4$; that is $\sqrt{A_3^2+A_4^2}$. The amplitude of the targeted engine order $EO_1$ at the virtual probe $P_v$ is $-A_5$.

The equation can then be written purely in terms of the targeted engine order $EO_1$, that is excluding the terms for the virtual engine order $EO_v$, as $d_k = A_0 + A_1 \sin(EO_1 \theta_k) + A_2 \cos(EO_1 \theta_k)$.

The method of the present invention optionally comprises a further step 68, shown in FIG. 4, to validate the derived equation by using the blade tip displacement measured at the probe $P_k$ which was replaced by the virtual probe $P_v$ in the selected virtual probe set 42. The measured displacement is compared with the displacement calculated from the equation to validate the method.

Advantageously, the first targeted engine order $EO_1$ can be a synchronous vibration mode, for example 10EO. Using the method of the present invention it is possible to extract the blade tip displacement amplitude and phase for targeted engine orders EO where each cycle is a multiple of the base angle, angular extent of the shroud segments. Thus the method of the present invention enables blade tip timing analysis of data from turbine rotor stages and other applications where the angular positions of timing probes 3 are restricted to multiples of a base angle.

A further advantage is that the virtual probe set 42 with a low, or the lowest, condition number CN is selected. Uncertainty is inversely correlated to the magnitude of condition number CN so using the virtual probe set 42 with a low or minimum condition number $CN_{min}$ minimises uncertainty in the blade tip timing data and the analysis methods.

The method of the present invention is preferably encompassed in computer-implemented code and stored on a computer-readable medium. It is thus a computer-implemented method of analysing blade tip timing data. The method may be implemented on a basic computer system comprising a processing unit, memory, user interface means such as a keyboard and/or mouse, and display means. The method may be performed 'offline' on data which has been measured and recorded previously. Alternatively it may be performed in 'real-time', that is at the same time that the data is measured. In this case the computer may be coupled to the system, for example turbine rotor, from which the blade tip timing data is obtained. Where the system forms part of a gas turbine engine 10 the computer may be an electronic engine controller or another on-board processor. Where the gas turbine engine 10 powers an aircraft, the computer may be an engine controller, a processor on-board the engine 10 or a processor on-board the aircraft.

Preferably the method of the present invention is repeated for each blade 4 in the array of blades 4 that form the rotor 2. Preferably the method is performed in parallel for at least two of the blades 4 in the array. Where the processor 34 on which the method is performed is a computer this is a simple matter. For example, the time of arrival measurements at each probe 3 for each of the blades 4 forming the array of blades 4 can be recorded in a multi-dimensional matrix. The necessary data can then be extracted by the processor 34 to perform the method for each blade 4. Alternatively the method may be performed in series for at least two of the blades 4 in the array.

Although the method steps have been described in a particular order, some of the steps may be performed in a different order. In particular the steps of incrementing the virtual probe angle $\theta v$ and the virtual engine order $EO_v$ may be performed in reverse.

The present invention also provides a blade tip displacement system comprising the rotor 2 having the array of blades 4 that rotate at a rotational speed. The system includes the probes 3 that are equally or irregularly spaced circumferentially around part or the whole circumference of a rotor casing at integer multiples of the base angle. The probes 3 are arranged to measure the arrival time of each blade tip and to pass the measurements to a processor 34. The processor 34 is configured to perform the method of the present invention.

Uncertainties and signal to noise ratios can be extracted by calculating the difference between the extracted and theoretical amplitudes of the virtual response.

The invention claimed is:

1. A method of analysing blade tip timing data obtained from an array ($P_k$) of stationary timing probes that are spaced at integer multiples of a base angle, the method comprising steps to:
   a) replace one of the probes in the array of probes ($P_k$) in a data analysis set with a virtual probe ($P_v$) to obtain a virtual probe set;
   b) set an initial probe angle ($\theta_v$) and an initial engine order ($EO_v$) for the virtual probe ($P_v$);
   c) calculate a condition number (CN) for the virtual probe set;
   d) if the condition number (CN) at least meets a threshold criterion, solve the virtual probe set for blade tip displacement amplitude; if the condition number (CN) does not meet the threshold criterion,
   e) for i=1 to m, increment the probe angle ($\theta_v$) of the virtual probe ($P_v$) by i and iterate from step c);
   f) for j=1 to n, increment the engine order ($EO_v$) of the virtual probe ($P_v$) by j and iterate from step c); and
   g) for k=1 to q, reinstate the replaced probe in the data analysis set and replace a different probe from the array of probes ($P_k$) in the data analysis set with the virtual probe ($P_v$); and iterate from step b).

2. A method as claimed in claim 1, wherein step f) is performed after step e) or before step e).

3. A method as claimed in claim 1, wherein the probe angle ($\theta_{vi}$) of the virtual probe ($P_v$) is set in the range 0° to 360°.

4. A method as claimed in claim 1, wherein the increment i at step e) is 0.1°.

5. A method as claimed in claim 1, wherein the engine order ($EO_{vj}$) of the virtual probe ($P_v$) is set in the range 0EO to 30EO.

6. A method as claimed in claim 1, wherein the increment j at step f) is 0.1EO.

7. A method as claimed in claim 1, wherein the engine order ($EO_{vj}$) of the virtual probe ($P_v$) is set to non-integer values.

8. A method as claimed in claim 1, wherein the threshold criterion is the minimum ($CN_{min}$) of all the condition numbers (CN) calculated at step c) or is an absolute condition number (CN).

9. A method as claimed in claim 1, wherein if the condition number (CN) at least meets a threshold criterion, solve the virtual probe set for blade tip displacement phase at step d).

10. A method as claimed in claim 1, comprising a further step to validate the method by calculating blade tip displacement ($d_k$) from the replaced probe.

11. A method as claimed in claim 1, wherein step a) comprises replacing two or more probes from the array of probes ($P_k$) with virtual probes ($P_v$) to give the virtual probe set.

12. A method as claimed in claim 11, wherein the minimum number of probes from the array of probes ($P_k$) in the virtual probe set is calculated as twice the number of simultaneous modes excited plus two.

13. A method as claimed in claim 1, wherein step c) comprises sub-steps to:
   i. form a matrix of the blade tip displacements ($d_k$) at each probe ($P_k$) in the virtual probe set;
   ii. perform singular value decomposition on the matrix; and
   iii. calculate the condition number (CN) by dividing the largest singular value by the smallest singular value.

14. A method as claimed in claim 1, wherein the base angle comprises the angular extent of a shroud segment to which a probe of the array of probes ($P_k$) is mounted.

15. A computer program having instructions adapted to carry out the method according to claim 1.

16. A computer readable medium, having a computer program recorded thereon, wherein the computer program is adapted to make the computer execute the method according to claim 1.

17. A computer program comprising the computer readable medium as claimed in claim 16.

18. A displacement system comprising:
   a) a rotor having an array of features that rotate at a rotational speed;
   b) an array ($P_k$) of stationary timing probes spaced at integer multiples of a base angle, the probes arranged to measure the time at which each feature passes the probe for each revolution of the rotor; and
   c) a processor configured to perform the method as claimed in claim 1.

19. A displacement system as claimed in claim 18, wherein each feature comprises a blade.

20. A gas turbine engine comprising the displacement system as claimed in claim 18, wherein the rotor comprises one of the group comprising: a compressor rotor; a fan; and a turbine rotor.

* * * * *